G. F. HOLLON.
CUTTER BAR ADJUSTING AND LOCKING MEANS.
APPLICATION FILED OCT. 29, 1917.

1,280,470.

Patented Oct. 1, 1918.

INVENTOR
George F. Hollon

WITNESSES

BY Victor J. Evans
ATTORNEY

UNITED STATES PATENT OFFICE.

GEORGE F. HOLLON, OF WACO, TEXAS.

CUTTER-BAR ADJUSTING AND LOCKING MEANS.

1,280,470.  Specification of Letters Patent.  Patented Oct. 1, 1918.

Application filed October 29, 1917. Serial No. 198,960.

*To all whom it may concern:*

Be it known that I, GEORGE F. HOLLON, a citizen of the United States, residing at Waco, in the county of McLennan and State of Texas, have invented new and useful Improvements in Cutter-Bar Adjusting and Locking Means, of which the following is a specification.

This invention relates to means for adjusting and locking the cutter bars of lawn mowers, and the object is to provide, in connection with a lawn mower of the reel and cutter bar type, improved means for adjusting the cutter bar, such means including a screw passing through a rigid portion of the frame and through the cutter bar, the end of the screw being reduced for forming a shoulder and being provided with washers, which engage respectively the upper and lower surfaces of the bar.

With the foregoing and other objects in view, the invention consists in the novel construction, combination and arrangement of elements hereinafter described and claimed.

Figure 1:
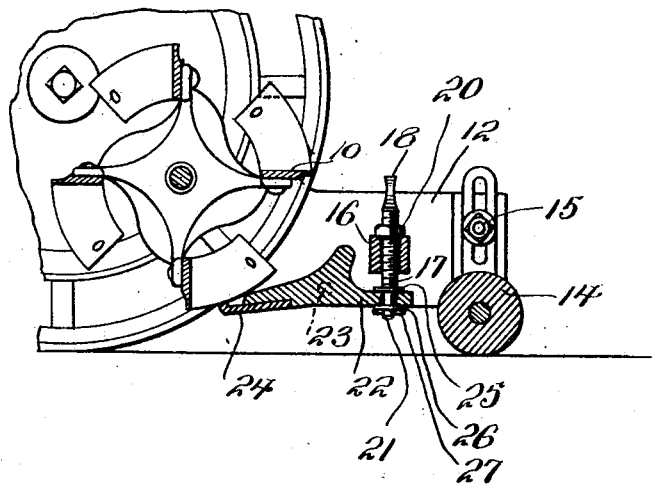
Figure 1 is a view in vertical section showing the reel and cutter bar in end elevation.
Figure 2:
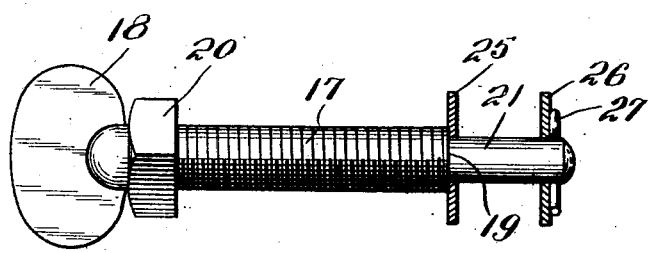
Fig. 2 is an enlarged view of the adjusting screw, the washers carried thereby being shown in section.

The adjusting device herein described is designed for use in connection with a pivotally mounted cutter bar carrying a knife which coöperates with the reel of a usual commercial type of lawn mower.

The reel is designated 10, a portion of the frame work is shown at 12 and the ground roller is designated 14, being adjustably mounted as shown at 15.

A rigid transverse bar 16 of the frame is provided with a vertically arranged and threaded aperture for the accommodation of the adjusting screw, the shank of which is shown at 17. This shank is threaded from a point adjacent to the head 18 to the shoulder 19, and that portion adjacent the head is engaged by a lock nut 20.

The end portion of the screw is of reduced diameter and is designated 21, the diameter of this reduced portion being substantially the same or slightly less than the diameter of the aperture in the cutter bar 22. The pivotal mounting of the bar last named is shown at 23 and the blade carried thereby is designated 24. A washer 25 encircles the reduced portion of the screw at a point adjacent to the shoulder 19 and engages the upper surface of the cutter bar, an additional washer 26 being provided for engagement with the lower surface of said cutter bar. In order to take up any play between the washers 25 and 26, or between the respective surfaces of the bar 22 and the washers, additional washers of leather or hard rubber may be provided. A cotter-pin 27 passes through an aperture in the end of the screw and engages washer 26.

In applying the adjusting and locking screw to a commercial type of lawn mower, a perfect fit should be effected in order to prevent any play or lost motion between the screw and the cutter bar 22 after adjustment has been secured. The adjustments made in practice are so slight that the fit of the washers on the cutter bar and against shoulder 19 and cutter pin 27 is sufficiently snug to prevent loose play of the cutter bar and tight enough to hold the cutter bar rigidly in any adjusted position. The head 18 of the screw may have any desired configuration but I prefer to have a flattened head as illustrated in the drawings.

What is claimed is:

The combination with a rigid member of the frame of a lawn mower and a pivotally mounted cutter bar, of an adjusting screw comprising a head, a threaded shank portion and a reduced end portion on the end of the shank remote from the head, said reduced portion forming a shoulder and the reduced portion having a smooth surface and passing freely through the cutter bar, a washer engaged by said shoulder and bearing against the upper portion of the cutter bar, a washer surrounding the reduced portion and engaging the lower surface of the cutter bar, means for securing the washer last mentioned in position, and a lock nut carried by the shank of the screw and engaging the upper surface of said rigid member, said screw being operable by the head for rotating the screw with reference to the cutter bar when the lock nut is released.

In testimony whereof I affix my signature.

GEORGE F. HOLLON.